(12) United States Patent
Lazanja et al.

(10) Patent No.: US 8,162,391 B2
(45) Date of Patent: Apr. 24, 2012

(54) AUTOMOTIVE VEHICLE SEAT INSERT

(75) Inventors: Marinko Lazanja, Windsor (CA); Goran Bajic, Belle River (CA); Ed Marlovits, Windsor (CA); Dmitri Axakov, Waterloo (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 13/172,067

(22) Filed: Jun. 29, 2011

(65) Prior Publication Data
US 2011/0266842 A1 Nov. 3, 2011

Related U.S. Application Data

(63) Continuation of application No. 12/856,883, filed on Aug. 16, 2010, now Pat. No. 7,971,931, which is a continuation of application No. 12/732,534, filed on Mar. 26, 2010, now Pat. No. 7,775,602, which is a continuation of application No. 12/354,191, filed on Jan. 15, 2009, now Pat. No. 7,735,932, which is a continuation of application No. 11/464,859, filed on Aug. 16, 2006, now Pat. No. 7,478,869.

(60) Provisional application No. 60/709,686, filed on Aug. 19, 2005, provisional application No. 60/787,363, filed on Mar. 30, 2006.

(51) Int. Cl.
*A47C 7/72* (2006.01)

(52) U.S. Cl. ......... 297/180.14; 297/180.12; 297/452.42; 297/452.46

(58) Field of Classification Search ............. 297/452.42, 297/452.43, 452.46, 452.47, 180.13, 180.14, 297/180.12
See application file for complete search history.

(56) References Cited

U.S. PATENT DOCUMENTS

| | | | |
|---|---|---|---|
| 374,424 A | 12/1887 | Ober | |
| 390,154 A | 9/1888 | Beach | |
| 1,370,832 A | 3/1921 | Mollberg | |
| 1,439,681 A | 12/1922 | Alkire et al. | |
| 1,475,912 A | 11/1923 | Williams | |
| 1,514,329 A | 11/1924 | Metcalf | |
| 1,537,460 A | 5/1925 | Campbell et al. | |
| 1,541,213 A | 6/1925 | Harley | |
| 1,593,066 A | 7/1926 | Gaston | |
| 1,664,636 A | 4/1928 | Mayer | |
| 1,837,515 A | 12/1931 | Bachrach | |
| 1,936,960 A | 11/1933 | Bowman | |
| 2,022,959 A | 12/1935 | Gordon | |
| 2,103,553 A | 12/1937 | Reynolds | |
| 2,158,801 A | 5/1939 | Petterson | |
| 2,336,089 A | 12/1943 | Gould | |

(Continued)

FOREIGN PATENT DOCUMENTS

CA 1266925 7/1960
(Continued)

OTHER PUBLICATIONS

Automotive Heated Seats—Heated Steering Wheels, IGB Automotive Ltd., received Assignee W.E.T. Automotive Systems, May 2003.

(Continued)

*Primary Examiner* — Sarah B McPartlin
(74) *Attorney, Agent, or Firm* — Dobrusin & Thennisch PC

(57) ABSTRACT

There is disclosed an insert suitable for use within a seating system of an automotive vehicle.

14 Claims, 9 Drawing Sheets

U.S. PATENT DOCUMENTS

| | | | |
|---|---|---|---|
| 2,493,303 A | 1/1950 | McCullough | |
| 2,544,506 A | 3/1951 | Kronhaus | |
| 2,703,134 A | 3/1955 | Mossor | |
| 2,749,906 A | 6/1956 | O'Connor | |
| 2,758,532 A | 8/1956 | Awe | |
| 2,782,834 A | 2/1957 | Vigo | |
| 2,791,956 A | 5/1957 | Guest | |
| 2,826,135 A | 3/1958 | Benzick | |
| 2,912,832 A | 11/1959 | Clark | |
| 2,931,286 A | 4/1960 | Fry, Sr. et al. | |
| 2,976,700 A | 3/1961 | Jackson | |
| 2,978,972 A | 4/1961 | Hake | |
| 2,992,604 A | 7/1961 | Trotman et al. | |
| 2,992,605 A | 7/1961 | Trotman et al. | |
| 3,030,145 A | 4/1962 | Kottemann | |
| 3,101,037 A | 8/1963 | Taylor | |
| 3,101,660 A | 8/1963 | Taylor | |
| 3,127,931 A | 4/1964 | Johnson | |
| 3,131,967 A | 5/1964 | Spaulding | |
| 3,136,577 A | 6/1964 | Richard | |
| 3,137,523 A | 6/1964 | Karner | |
| 3,162,489 A | 12/1964 | Trotman | |
| 3,209,380 A | 10/1965 | Watsky | |
| 3,486,177 A | 12/1969 | Marshack | |
| 3,529,310 A | 9/1970 | Olmo | |
| 3,550,523 A | 12/1970 | Segal | |
| 3,552,133 A | 1/1971 | Lukomsky | |
| 3,628,829 A | 12/1971 | Hellig | |
| 3,638,255 A | 2/1972 | Sterrett | |
| 3,653,589 A | 4/1972 | McGrath | |
| 3,653,590 A | 4/1972 | Elsea | |
| 3,681,797 A | 8/1972 | Messner | |
| 3,684,170 A | 8/1972 | Roof | |
| 3,732,944 A | 5/1973 | Kendall | |
| 3,736,022 A | 5/1973 | Radke | |
| 3,738,702 A | 6/1973 | Jacobs | |
| 3,757,366 A | 9/1973 | Sacher | |
| 3,770,318 A | 11/1973 | Fenton | |
| 3,778,851 A | 12/1973 | Howorth | |
| 3,948,246 A | 4/1976 | Jenkins | |
| 4,002,108 A | 1/1977 | Drori | |
| 4,043,544 A | 8/1977 | Ismer | |
| 4,044,221 A | 8/1977 | Kuhn | |
| 4,060,276 A | 11/1977 | Lindsay | |
| 4,065,936 A | 1/1978 | Fenton et al. | |
| 4,072,344 A | 2/1978 | Li | |
| 4,141,585 A | 2/1979 | Blackman | |
| 4,175,297 A | 11/1979 | Robbins et al. | |
| 4,245,149 A | 1/1981 | Fairlie | |
| 4,259,896 A | 4/1981 | Hayashi et al. | |
| 4,268,272 A | 5/1981 | Taura | |
| 4,335,725 A | 6/1982 | Geldmacher | |
| 4,379,352 A | 4/1983 | Hauslein et al. | |
| 4,391,009 A | 7/1983 | Schild et al. | |
| 4,413,857 A | 11/1983 | Hayashi | |
| 4,509,792 A | 4/1985 | Wang | |
| 4,563,387 A | 1/1986 | Takagi et al. | |
| 4,572,430 A | 2/1986 | Takagi et al. | |
| 4,589,656 A | 5/1986 | Baldwin | |
| 4,665,707 A | 5/1987 | Hamilton | |
| 4,671,567 A * | 6/1987 | Frobose | 297/452.42 |
| 4,685,727 A | 8/1987 | Cremer et al. | |
| 4,712,832 A | 12/1987 | Antolini et al. | |
| 4,729,598 A | 3/1988 | Hess | |
| 4,777,802 A | 10/1988 | Feher | |
| 4,847,933 A | 7/1989 | Bedford | |
| 4,853,992 A | 8/1989 | Yu | |
| 4,866,800 A | 9/1989 | Bedford | |
| 4,905,475 A | 3/1990 | Tuomi | |
| 4,923,248 A | 5/1990 | Feher | |
| 4,946,220 A | 8/1990 | Wyon et al. | |
| 4,964,674 A | 10/1990 | Wetmann et al. | |
| 4,981,324 A | 1/1991 | Law | |
| 4,997,230 A | 3/1991 | Spitalnick | |
| 5,002,336 A | 3/1991 | Feher | |
| 5,004,294 A | 4/1991 | Lin | |
| 5,016,302 A | 5/1991 | Yu | |
| 5,076,643 A | 12/1991 | Colasanti et al. | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,211,697 A | 5/1993 | Kienlein et al. | |
| 5,226,188 A | 7/1993 | Liou | |
| 5,292,577 A | 3/1994 | Van Kerrebrouck et al. | |
| 5,335,381 A | 8/1994 | Chang | |
| 5,354,117 A | 10/1994 | Danielson et al. | |
| 5,356,205 A | 10/1994 | Calvert et al. | |
| 5,370,439 A | 12/1994 | Lowe et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,450,894 A | 9/1995 | Inoue et al. | |
| 5,516,189 A | 5/1996 | Ligeras | |
| 5,524,439 A | 6/1996 | Gallup et al. | |
| 5,561,875 A | 10/1996 | Graebe | |
| 5,590,428 A | 1/1997 | Roter | |
| 5,597,200 A | 1/1997 | Gregory et al. | |
| 5,613,729 A | 3/1997 | Summer, Jr. | |
| 5,613,730 A | 3/1997 | Buie et al. | |
| 5,626,021 A | 5/1997 | Karunasiri et al. | |
| 5,626,386 A | 5/1997 | Lush | |
| 5,626,387 A | 5/1997 | Yeh | |
| 5,639,145 A | 6/1997 | Alderman | |
| 5,645,314 A | 7/1997 | Liou | |
| 5,692,952 A | 12/1997 | Chih-Hung | |
| 5,701,621 A | 12/1997 | Landi et al. | |
| 5,715,695 A | 2/1998 | Lord | |
| 5,787,534 A | 8/1998 | Hargest et al. | |
| 5,833,309 A | 11/1998 | Schmitz | |
| 5,833,321 A | 11/1998 | Kim et al. | |
| 5,887,304 A | 3/1999 | Von der Heyde | |
| 5,897,162 A | 4/1999 | Humes et al. | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A | 7/1999 | Kawai et al. | |
| 5,924,766 A | 7/1999 | Esaki et al. | |
| 5,924,767 A | 7/1999 | Pietryga | |
| 5,927,817 A | 7/1999 | Ekman et al. | |
| 5,934,748 A | 8/1999 | Faust et al. | |
| 6,003,950 A | 12/1999 | Larsson | |
| 6,019,420 A | 2/2000 | Faust et al. | |
| 6,048,024 A | 4/2000 | Wallman | |
| 6,049,927 A | 4/2000 | Thomas et al. | |
| 6,059,018 A | 5/2000 | Yoshinori et al. | |
| 6,059,362 A | 5/2000 | Lin | |
| 6,062,641 A | 5/2000 | Suzuki et al. | |
| 6,064,037 A | 5/2000 | Weiss et al. | |
| 6,068,332 A | 5/2000 | Faust et al. | |
| 6,079,485 A | 6/2000 | Esaki et al. | |
| 6,084,217 A * | 7/2000 | Bulgajewski | 219/505 |
| 6,085,369 A | 7/2000 | Feher | |
| 6,105,667 A | 8/2000 | Yoshinori et al. | |
| 6,109,688 A | 8/2000 | Wurz et al. | |
| 6,119,463 A | 9/2000 | Bell | |
| 6,124,577 A | 9/2000 | Fristedt | |
| 6,145,925 A | 11/2000 | Eksin et al. | |
| 6,147,332 A | 11/2000 | Holmberg et al. | |
| 6,164,719 A | 12/2000 | Rauh | |
| 6,179,706 B1 | 1/2001 | Yoshinori et al. | |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,223,539 B1 | 5/2001 | Bell | |
| 6,224,150 B1 | 5/2001 | Eksin et al. | |
| 6,237,675 B1 | 5/2001 | Oehring et al. | |
| 6,254,179 B1 | 7/2001 | Kortume et al. | |
| 6,263,530 B1 | 7/2001 | Feher | |
| 6,273,810 B1 | 8/2001 | Rhodes et al. | |
| 6,277,023 B1 | 8/2001 | Schwartz | |

| | | |
|---|---|---|
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman |
| 6,425,637 B1 | 7/2002 | Gardner et al. |
| 6,434,328 B2 | 8/2002 | Rutherford |
| 6,478,369 B1 | 11/2002 | Aoki et al. |
| 6,481,801 B1 | 11/2002 | Schmale |
| 6,483,087 B2 | 11/2002 | Gardner et al. |
| 6,491,578 B1 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,682,140 B2 | 1/2004 | Minuth et al. |
| 6,685,553 B2 | 2/2004 | Aoki |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,828,528 B2 | 12/2004 | Stöwe et al. |
| 6,840,576 B2 * | 1/2005 | Ekern et al. ............. 297/180.14 |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,957,545 B2 | 10/2005 | Aoki |
| 6,976,734 B2 | 12/2005 | Stoewe |
| 6,988,770 B2 * | 1/2006 | Witchie .................... 297/180.14 |
| 7,052,091 B2 | 5/2006 | Bajic et al. |
| 7,083,227 B2 | 8/2006 | Brennan et al. |
| 7,131,689 B2 | 11/2006 | Brennan et al. |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0067058 A1 | 6/2002 | Pfahler |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2004/0036326 A1 | 2/2004 | Bajic |
| 2004/0100131 A1 | 5/2004 | Howick et al. |
| 2004/0104607 A1 | 6/2004 | Takeshi et al. |
| 2004/0118555 A1 | 6/2004 | Fristedt |
| 2004/0139758 A1 | 7/2004 | Toshifumi et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0066505 A1 | 3/2005 | Iqbal et al. |
| 2005/0067862 A1 | 3/2005 | Iqbal et al. |
| 2005/0093347 A1 | 5/2005 | Bajic et al. |
| 2005/0140189 A1 | 6/2005 | Bajic et al. |
| 2005/0173950 A1 | 8/2005 | Bajic et al. |
| 2005/0200179 A1 | 9/2005 | Bevan et al. |
| 2005/0257541 A1 | 11/2005 | Kadle et al. |
| 2005/0264086 A1 | 12/2005 | Lofy et al. |
| 2006/0103183 A1 * | 5/2006 | White et al. .............. 297/180.14 |
| 2006/0152044 A1 | 7/2006 | Bajic et al. |
| 2006/0158011 A1 | 7/2006 | Marlovits et al. |
| 2007/0001507 A1 | 1/2007 | Brennan et al. |

FOREIGN PATENT DOCUMENTS

| | | |
|---|---|---|
| CA | 2393970 | 6/2001 |
| DE | 3513909 | 10/1986 |
| DE | 37 05 756 | 10/1988 |
| DE | 41 12 631 | 4/1992 |
| DE | 19503291 | 8/1996 |
| DE | 19654370 | 3/1998 |
| DE | 197 36 951 | 3/1999 |
| DE | 197 37 636 | 3/1999 |
| DE | 19805174 | 6/1999 |
| DE | 19804284 | 8/1999 |
| DE | 198 10 936 | 9/1999 |
| DE | 199 20 451 | 12/1999 |
| DE | 199 54 97 | 1/2001 |
| DE | 100 01 314 | 7/2001 |
| DE | 100 24 880 | 9/2001 |
| DE | 10013492 | 9/2001 |
| DE | 10030708 | 1/2002 |
| DE | 10116345 | 6/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0 128 534 | 12/1984 |
| EP | 0 280 213 | 8/1988 |
| EP | 0 517 615 | 12/1992 |
| EP | 411375 | 5/1994 |
| EP | 0809576 | 5/1999 |
| EP | 0 730 720 | 7/2000 |
| EP | 1088696 | 9/2000 |
| EP | 1050429 | 11/2000 |
| EP | 1123834 | 2/2001 |
| EP | 1266794 | 12/2002 |
| EP | 1 075 984 | 5/2003 |
| EP | 1323573 | 7/2003 |
| EP | 1349746 | 8/2005 |
| ET | 0 936 105 | 8/1999 |
| FR | 1266925 | 9/1960 |
| FR | 2599683 | 6/1986 |
| FR | 2630056 | 10/1989 |
| FR | 2694527 A1 | 2/1994 |
| FR | 2845318 | 4/2004 |
| JP | 1171509 | 7/1989 |
| JP | 5277020 | 10/1993 |
| JP | 07290466 | 11/1995 |
| JP | 8285423 | 11/1996 |
| JP | 10044756 | 2/1998 |
| JP | 2000125990 | 2/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |

| | | |
|---|---|---|
| JP | 2004283403 | 10/2004 |
| SE | 202556 | 3/1966 |
| SE | 0102983 | 3/2003 |
| WO | WO 91/12150 | 8/1991 |
| WO | WO 94/09684 A1 | 5/1994 |
| WO | WO 96/05475 | 2/1996 |
| WO | WO 97/09908 | 3/1997 |
| WO | WO 99/00268 | 1/1999 |
| WO | WO 02/06914 A1 | 1/2002 |
| WO | WO 02/005341 | 7/2002 |
| WO | WO 03/015583 A2 | 2/2003 |
| WO | WO 03/051666 | 6/2003 |
| WO | WO 03/077710 | 9/2003 |
| WO | WO 03/101777 | 12/2003 |
| WO | WO 03/106215 | 12/2003 |
| WO | WO 2004/005068 | 1/2004 |
| WO | WO 2004/082989 | 3/2004 |
| WO | WO 2004/028857 | 4/2004 |
| WO | WO 2004/078517 | 9/2004 |
| WO | WO 2004/091966 | 10/2004 |
| WO | WO 2004/091967 | 10/2004 |
| WO | WO 2004/096601 | 11/2004 |
| WO | WO 2004/096602 | 11/2004 |
| WO | WO 2005/021320 | 3/2005 |
| WO | WO 2005/035305 | 4/2005 |
| WO | WO 2005/042299 | 5/2005 |
| WO | WO 2005/042301 | 5/2005 |
| WO | WO 2005/047056 | 5/2005 |
| WO | WO 2005/068253 | 7/2005 |
| WO | WO 2005/110806 | 11/2005 |

OTHER PUBLICATIONS

Automotive Seat Heating Systems, Bauerhin International, received by Assignee W.E.T. Automotive Systems, May 2002.
Excerpt from website http://www.icar.com/html_pages / about_icar/current_events_news/advantage/advantageI-Car Advantage Online.
Excerpt from website http://www.seatcomfort.com/semashow1.htm, Specializing in Seat Ventilation and Heating Systems, Seat Comfort Systems Unveils 3 New Seat Heater Products.
Excerpt from website http://www.seatcomfort.com/ventilation.htm, Specializing in Seat Ventilation and Heating Systems, Ventilation.
GMT 830 Heating & Ventilation System, IGB Automotive Ltd., received by Assignee W.E.T. Automotive Systems, Jun. 2003.
International Search Report for Application Serial No. PCT/US03/19929, Oct. 10, 2003.
Komfortabel bei jeder Temperatur.
Seat Heating Systems, Kongsberg Automotive, believed to be from websitehttp://www.kongsberg-automotive.no/.
Copending U.S. Appl. No. 09/619,171, filed Jul. 19, 2000.
Copending U.S. Appl. No. 60/505,806, filed Aug. 25, 2003.
Copending U.S. Appl. No. 11/623,833, filed Jan. 17, 2007.

* cited by examiner

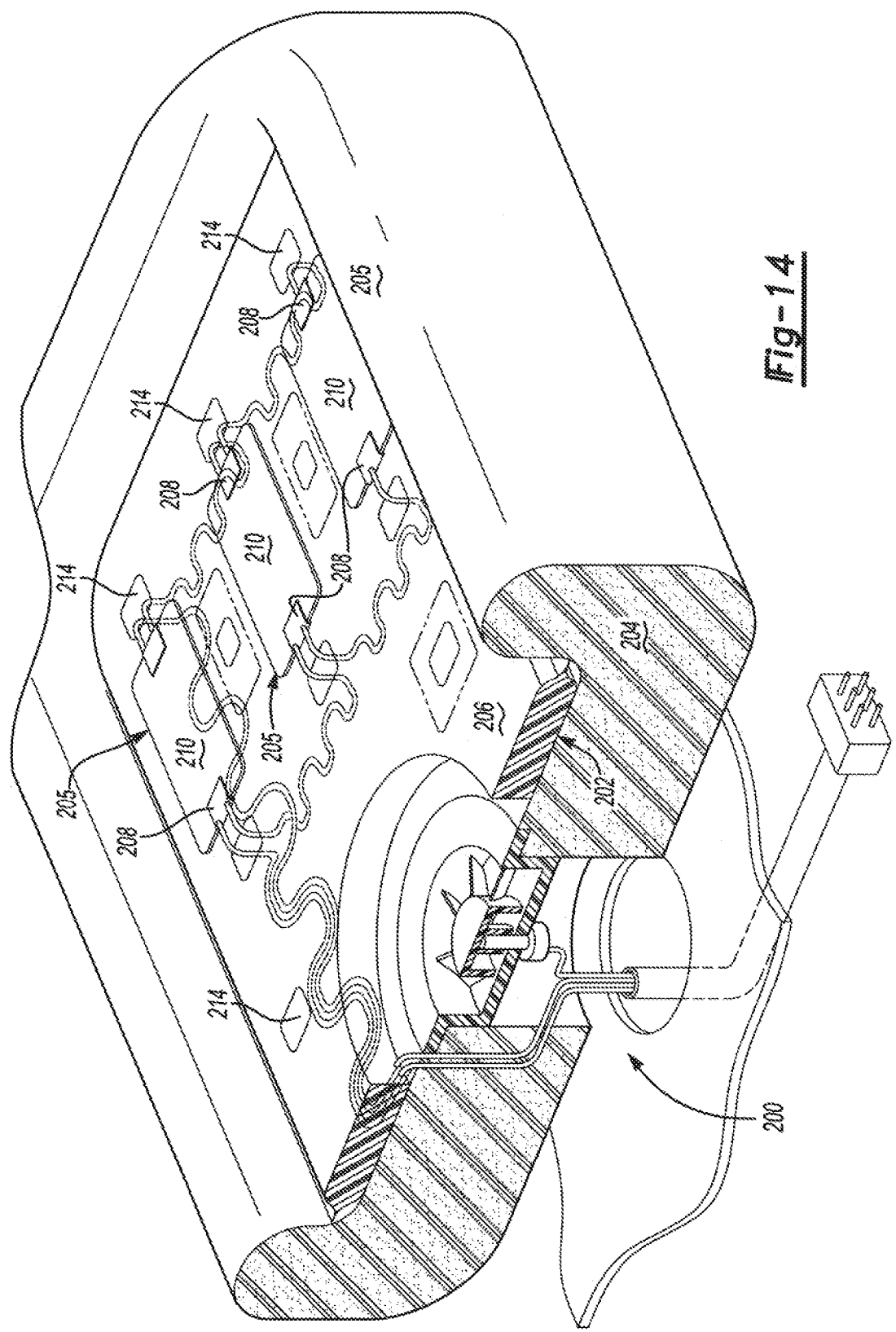

US 8,162,391 B2

AUTOMOTIVE VEHICLE SEAT INSERT

CLAIM OF PRIORITY

This application is a continuation of U.S. application Ser. No. 12/856,883, filed Aug. 16, 2010, now U.S. Pat. No. 7,971,931, which is a continuation of U.S. patent application Ser. No. 12/732,534, filed Mar. 26, 2010, which is a continuation of Ser. No. 12/354,191, filed Jan. 15, 2009, now U.S. Pat. No. 7,735,932, which is a continuation of Ser. No. 11/464,859, filed Aug. 16, 2006, now U.S. Pat. No. 7,478,869, which is a non-provisional of application number 60/709,686, filed Aug. 19, 2005, which is a non-provisional of application number 60/787,363, filed Mar. 30, 2006, the contents of which are hereby incorporated by reference in their entirety.

FIELD OF THE INVENTION

The present invention relates generally to automotive vehicle seats, and more particularly to an insert for providing heating, cooling, ventilation or a combination thereof to a seat of an automotive vehicle.

BACKGROUND OF THE INVENTION

For many years the transportation industry has been concerned with designing seats for automotive vehicles that provide added comfort to occupants in the seats. Such comfort can be enhanced by providing heating, ventilation, cooling or a combination thereof to the seats and/or the occupant of the seats.

More recently, industry began to design inserts that can be assembled to seats for at least assign in providing heating, ventilation, cooling or a combination thereof. Examples of such inserts are provided in U.S. Patent Application 2002/0096931 and U.S. Pat. No. 6,893,086 both of which are fully incorporated herein by reference for all purposes. Accordingly the present invention provides an insert for providing added comfort to a seat of an automotive vehicle or other seat.

SUMMARY OF THE INVENTION

Accordingly an insert is provided for a seating system. The insert typically includes a spacer material creating an open space within the insert and can include at least one sealed edge, a single sealed edge or no sealed edges. The insert can be applied to various different seats by is preferably configured for application to a vehicle seat having a seat cushion and a seat backrest cushion wherein at least one of the seat or the backrest is ventilated. Each ventilated component should have an air-permeable trim surface at the occupant contact areas of the seat particularly where the insert is configured to be located beneath the trim surface of each ventilated component. An air mover is also typically in fluid communication with the open space within the insert.

BRIEF DESCRIPTION OF THE DRAWINGS

The features and inventive aspects of the present invention will become more apparent upon reading the following detailed description, claims and drawings, of which the following is a brief description:

FIG. 14 is a perspective cut-away view of an exemplary seat comfort system according to an aspect of the present invention.

DETAILED DESCRIPTION OF THE INVENTION

The present invention is predicated upon providing an insert suitable for placement within an automotive vehicle seat to provide heating, cooling, ventilation or a combination thereof to an occupant in the seat. Generally, the insert will define an open space with one or more barrier materials or barrier layers that substantially enclose of spacer material and/or cooperatively substantially enclose a spacer material with other portions of a seat. As used herein, barrier materials or barrier layers are materials or layers that are substantially impermeable to fluid flow. Such barrier materials or layers will typically include one or more openings in fluid communication with the open space such that fluid and particularly air can flow through the one or more openings and the open space. Preferably, although not required, the insert will include a plurality of holes extending through the barrier material or layer such that the insert can distribute air to a substantial portion of a seating surface or pull air from about a substantial portion of a seating surface.

Figure 1:
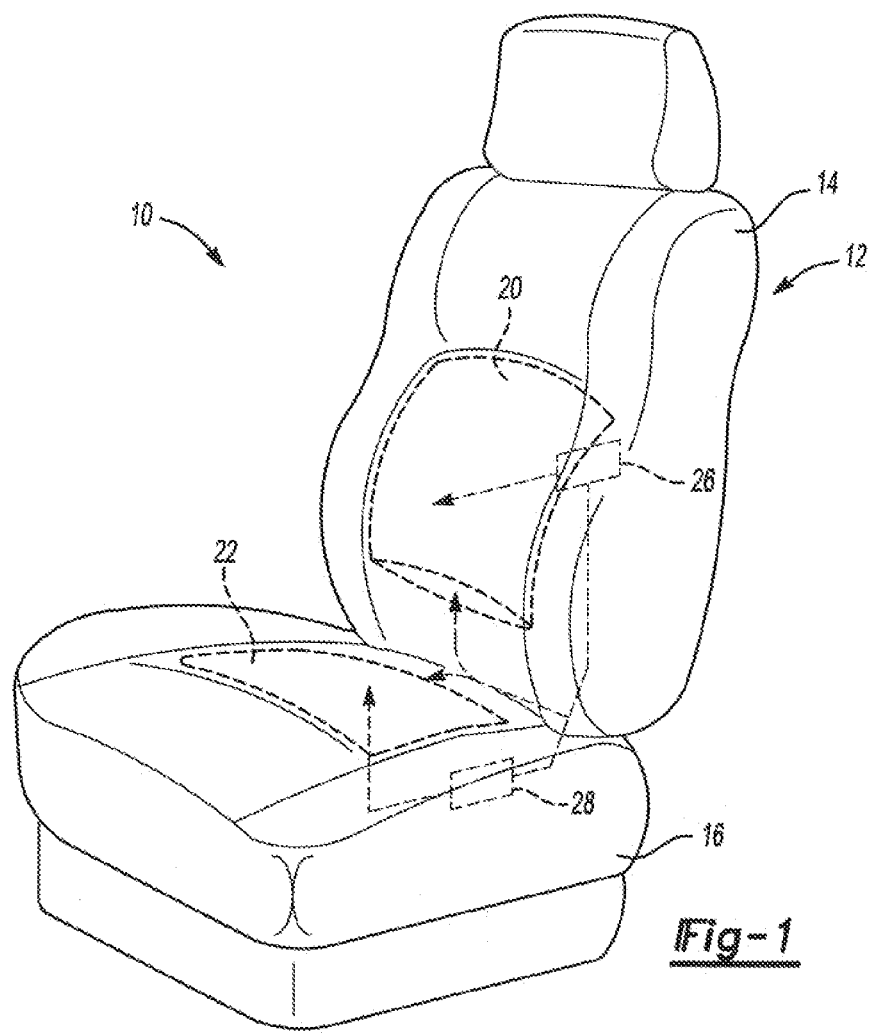
FIG. 1 is a schematic view of an exemplary seating system according to an aspect of the present invention.

Referring to FIG. 1 there is illustrated a seating system 10 according to the present invention. The seating system 10 includes a seat 12 with a backrest cushion 14 and a seat cushion 16. The system 10 can include one or more inserts and can include one or more air movers. As shown, one insert 20 overlays the backrest cushion 14 and one insert 22 overlays the seat cushion 16. The system 10 is also shown to include a first air mover 26 in fluid communication with the insert 20 over the backrest cushion 14 and a second air mover 28 in fluid communication with the insert 22 over the seat cushion 16.

For providing ventilation to a seat or seat occupant, the one or more air movers will typically be configured to move air through the open space within an insert and past and/or through a trim layer (e.g., leather covering) of a seat. The one or more air movers can be configured to pull air past or through the trim layer followed by pulling air through the open space within the insert. Alternatively, the one or more air movers can be configured to push air through the open space of the insert and past or through the trim layer.

Generally, the one or more air movers can be in fluid communication with the inserts using a variety of techniques. As one example, the insert itself may be configured to form a tubular structure in fluid communication with the open space of the insert wherein the tubular structure has an opening that can extend to and be placed in fluid communication with the air mover. As another example, a separate tubular structure may be employed to extend between the one or more air movers and the one or more inserts for providing fluid communication therebetween. Such tubular structures can extend through the seat or backrest cushion, around the seat or backrest cushion and/or between the seat cushion and the backrest cushion.

In one aspect the tongue or extension of the insert is a tail portion connected to the main sitting portion of the insert. The tail portion will typically have a width that is less than the rest of the insert, however this is not necessarily the case and the width of the tail portion may vary over its length, as seen in U.S. Pat. No. 6,840,576. In one embodiment, the tail portion extends from an edge of the main portion of the insert, such that it is co-planar with the rest of the insert (at least at some point during it manufacture or transport). In another embodiment, the tail portion protrudes from the underside of the insert. The tail portion may share a single piece of spacer material and/or the other layers of the insert with the main portion and be integrally formed with the main portion as in the previous embodiment, but separate materials may also be utilized. Forming the protruding tail portion may include sealing a portion of the barrier layer onto itself to create a sealed edge of the main portion, thus, having the tail portion located next to, but separate from, the sealed edge. Where a single sheet of barrier material is used for both the topside of the main portion and the tail portion. the forming may also include sealing a portion of the barrier layer onto itself to create a sealed crease in the barrier layer that effectively operates as a sealed edge of the insert.

For providing heat, an insert according to the present invention can include a heater located upon the insert. For example, a heater layer comprised of electric elements and particularly heating elements (e.g., metal or carbon fiber wires) laminated or otherwise attached to a substrate may be attached (e.g., laminated) to the insert. Alternatively, the heating elements can be attached directly to a barrier layer or barrier material of the insert or, alternatively, can be attached to other portions of the insert. It is also contemplated that electric elements such as thermoelectric elements may be employed in the same manner as the heating elements, but may be used for providing heating or cooling to the seating system or an occupant therein.

For providing cooling, air from or to the one or more air movers may be cooled using a variety of cooling devices. As one example, thermoelectric devices may be integrally incorporated with or may be operationally connected to the one or more air movers for cooling air that is being pushed into the one or more inserts. As an alternative, air from the HVAC (heating, ventilation and cooling) system of an automotive vehicle may be channeled or guided to the one or more inserts.

Openings (e.g., through-holes or perforations) on a forward or upper surface of the insert may be arranged to facilitate even air flow to or from the occupant or trim surface. In one embodiment, perforations located proximate to the air mover generally have a smaller cross-sectional area than perforation located further from the air mover. By increasing the cross-section area of the perforations as distance from the air mover increase, the air flow through the perforation may be equalized. Alternately, the perforations may be groups by their distance from the air mover, such that a group proximate to the air mover has a smaller total cross-sectional area than a group further from the air mover, as illustrated in U.S. Pat. No. 6,869,140, incorporated by reference.

In addition, the perforations may be arranged to direct air flow to particular locations on the forward or upper surface of the insert. For example, the perforations may be formed in a V pattern that generally corresponds to the occupant's body on the seat. In this way, air flow may be directed to or from the occupant in an efficient manner. In addition, perforations may be placed such that inserts in the bolsters of the cushion, whether behind the knees or at the thighs of the occupant, provide directed air flow to these portions of the occupant.

The insert may include a tongue, as described in U.S. Pat. No. 6,840,576, or an extension as described in U.S. Pat. No. 6,893,086, both incorporated by reference. In the alternative, no tongue or extension is utilized. Rather, one or more conduits that do not include spacer may fluidity connect the air mover to the insert. The conduit may attach to the insert in similar locations as the tongue or extension. In the alternative, the conduit may facilitate fluid communication between the underside of the insert and the air mover. The conduit may directly connect the air mover to the insert or the conduit may connect to the cushion which in turn fluidly communicates with the underside of the insert. The cushion may include a conduit or other through hole in the cushion material. The cushion preferably includes an air impermeable coating or lining. Multiple conduits or through holes may be utilized to provide circulation or recirculation of air through the insert, cushion or vehicle cabin. The cushion may include an inset or cavity to house the air mover on the underside or in the middle of the cushion.

In another embodiment, the air mover may be located locally to the insert, such the inlet or outlet of the air mover is attached or adjacent to the insert. In one aspect, the air mover may be located underneath the insert in the cushion. In another aspect, the air mover is located such that its inlet or outlet is adjacent to an edge of the insert such that the air mover and insert are relatively in the same plane. In either aspect, the air mover may be attached to the cushion through any of the mechanisms previously discussed to attach the insert to the seat, such as with an adhesive, a mechanical fastener, etc. For example, the air mover may be held to the cushion or insert by hook and loop fastener, through snap fit attachments to the cushion or insert. In the alternative, brackets may be molded into the cushion such that the air mover is snapped, slid or otherwise secured to the brackets. In the alternative, the cushion may include one or more wires (e.g. a wire mesh) to which the air mover may be attached, such through cable tie or additional wires. Preferred attachments mechanisms include those that do not transmit or amplify vibration or noise from the air mover to the seat or passenger compartment.

In one embodiment, the cushion includes an inset or cavity which houses the air mover. By locating the air mover locally to the insert, assembly of the system may be simplified. Additional conduits or through holes in the cushion material provide fluid communication to inlet/outlet of the air mover that is not attached or adjacent to the insert. For example, if the air mover is located underneath the insert in a cavity in the cushion and the system draws air such that the air mover inlet is adjacent to the insert, a conduit or through hole may connect the outlet of the air mover to the underside of the seat to provide an exhaust location for the air mover.

In one embodiment, the controller and an air mover are combined into a single housing, thus easing installation and reducing materials cost. The controller in such a combination may control the entire system such any heating element, thermoelectric devices or other air movers. Alternately, the controller combine with the air mover may act as a slave to a separate master controller. In one aspect, the slave controller may take over operation of the entire system should the master controller fail.

In one embodiment, the controller may be separate from the air mover in its own housing, whether connected to the air mover by a wiring harness or connect to a common platform with the air mover. Separating the controller from the air mover may simplify the construction of the housing for each as well reduce the chance of interference between the air mover and the controller and may allow for improved cushion flexibility.

In one embodiment, the noise produced by operation of the air mover is abated. In one aspect, the housing of the air mover comprises a double wall with a space between the walls. Air in the space would act as noise insulation. Besides air, other noise abatement materials (e.g. foams) may be used in the space to increase noise abatement. In addition, noise abatement materials may be included on the interior or exterior of the air mover housing. In one aspect, the air mover is encased in a noise abatement foam with connection points for an inlet, an outlet and any necessary electronics (e.g. the controller or sensors). By encasing the air mover in foam, a modular package is created that simply needs to be incorporated into the over all system. As discussed above, the air mover may be seated in an inset or cavity of the cushion. If the cushion is foam, this would act as a noise abatement material to reduce air mover noise and vibration.

In addition to insulation, other noise abatement techniques may be utilized. A muffler may be attached to the outlet of the air mover. The muffler may include a series of baffles or other devices on it interior to absorb noise without seriously impeding air flow through the system. Alternately, the muffler is merely a length of tubing or conduit covered in noise abatement material (e.g. foam).

In one embodiment, the insert is an edge sealed insert such that the periphery of the bag has been sealed to form an air impermeable barrier. Edge sealing may be accomplished through the use of an adhesive (e.g. a pressure sensitive adhesive), IR, RF or ultrasonic welding. In another embodiment less than the entire periphery of the insert is sealed. For example, the periphery is of the insert is sealed except for the location of attachment for the air mover or the conduit connecting the air mover to the insert.

As discussed above, the cushion may include one or more through holes to accommodate other components in the system. In addition, other through holes may be useful for attaching the trim cover to the cushion from underneath (e.g. U.S. Pat. No. 6,003,950) or for routing the tongue or extension through the cushion to the underside or rear side of the seat.

In one embodiment, the insert has a seal that extends along a segment of insert without extending about the entire periphery of the insert. For example such a seal could extend substantially continuously one along a line segment or an arc. Such a seal can extend along a length or width of the insert. Forming such an insert could be accomplished according to a variety of techniques. As one example, a bag (e.g., a polymeric or thermoplastic bag) having an opening is provided, a spacer material is then inserted in the bag and the opening of the bag is then sealed (e.g., melt sealed, adhesively sealed, sewn, combinations thereof or the like) for forming one of the aforecdescribed seals.

The system of the present invention also contemplates a seat or backrest cushion that includes one or more (e.g., 2, 3, 4, 5 or more) openings (e.g., ducts) extending therethrough. Such openings will typically be in fluid communication with the one or more air movers. In this manner, the seat or backrest cushions can act as a manifold for providing air to an insert overlaying the cushion. The insert in this situation can includes multiple openings corresponding to the openings of cushion or have a generally open portion to provide fluid communication between the insert, the openings of the cushion and the one or more air movers.

Figure 2:
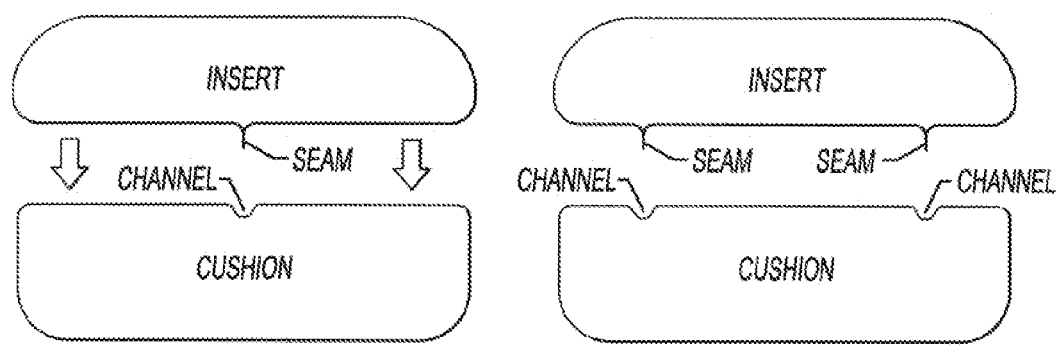
FIG. 2 illustrates exemplary inserts and seat cushions according to an aspect of the present invention.

In another embodiment, instead of or in addition to the inclusion of a peripheral seal (and any attendant sealed edge), the insert is sealed along one or more seams that are located on a bottom surface of the insert, such as is shown in FIG. 2. Using such approach, it may be also possible to secure the insert into a seat cushion, by providing a channel in the cushion adapted to receive the seam. The channels may be configured to include a tether for attaching to the insert, a snap for snap fitting the insert to the cushion, an adhesive into which the insert is placed and that can be hardened or cured with the insert secured in place, any combination thereof, or otherwise. Any of the mechanical or adhesive fasteners discussed below may be used to attach the insert into the channel (e.g. hook and loop fastener, Dennison tags, staples, etc.). The seam itself can be formed using any approach disclosed herein for sealing peripheral edges. It is also possible that the seam may be formed by stitching, stapling or some other mechanical attachment. If so, a seal may be formed, for example, by running the seam into an adhesive bead disposed in the channel of the cushion. In this manner, both sealing of the insert and attachment of the insert to the cushion can be accomplished by the use of the adhesive.

Any of a number of alternative approaches may be employed for securing inserts and other components relative to each other and beneath a trim cover. Of course, one possible approach is to secure an insert or a component (e.g., a heater layer, a reticulated foam or some other spacer, or a combination thereof) directly to the trim cover, whether by sewing, by adhesive, by fastening (e.g., by use of a staple, a snap, a hook and loop fastener, or otherwise), or any combination thereof. It is also possible for example to keep components or the insert separate from the trim cover, but still maintain stability beneath the trim cover, such as by attaching the insert any component, or a combination thereof, by a fastener (e.g., a staple, a snap, a hook and loop fastener, or otherwise) to another component (e.g. the seat cover), to the seat cushion (e.g., by attachment directly to the foam), or both. For example, one possible approach is the use of a strip, strap, cable, filament, yarn, staple, stitching, cable-tie, tether or some other fastener, and particularly fasteners made of a molded, drawn or extruded plastic, such as a polyamide, an aramid (e.g., Kevlar®), a polyurethane, or the like. Other materials may also be employed in the fasteners such as metal (e.g., stainless steel wire, copper staples, or otherwise), carbon fiber, or the like. One possible approach is to employ a fastener that has enlarged ends (e.g. barbs, wings or anchors) relative to a thinned central section, the enlarged ends providing additional load distribution area, and/or for resisting pull through relative to the attached parts. Examples of fasteners that may be employed are those that are secured by hand using a hand attachment gun, by using a semi-automated or even an automated attachment machine (e.g., a machine as employed for conventional tag attachment). Illustrative commercial products suitable for use as fasteners include those available (e.g., through Avery Dennison) under the designations MicroPin™, MicroTach™, Swiftach® Paddle Fasteners; T-End® Fasteners; Hook-Tach® Fasteners, Secur-a-Tach® Loop Fasteners; Secur-a-Tie®; Tag Fast™ Double Paddle Fasteners, and the generic equivalents of the foregoing. In another aspect, fasteners or portions there of may be held or anchored within the cushion such that the insert may be then attached to the fastener protruding from the cushion. For example, during formation of the cushion, clips, slides screws, or bolts may be molded into the cushion. The appropriate clasp or receiver on the insert may then be used to attach the insert to the cushion. As with other fasteners, metal, plastic, carbon fiber or materials may be used for the anchored fasteners.

The attachment may occur by an assembler at the time of assembling the system into a seat, at the time of manufacturing the components of the system prior to assembly into the seat, at the time of fabricating the trim cover, or any combination. In one embodiment, the attachment of the insert occurs during the formation of the seat cushion, such that the insert is molded to the seat cushion. Alternately, attachment occurs by sewing the insert or portions thereof to the cushion.

It may also be possible to integrally form a neck in the insert that can function to penetrate through an opening in an upper surface of a seat cushion. The resulting assembly this would include the insert in fluid communication with an air mover, e.g., by a direct connection with the air mover, or by being spaced apart from the air mover.

Figure 3:
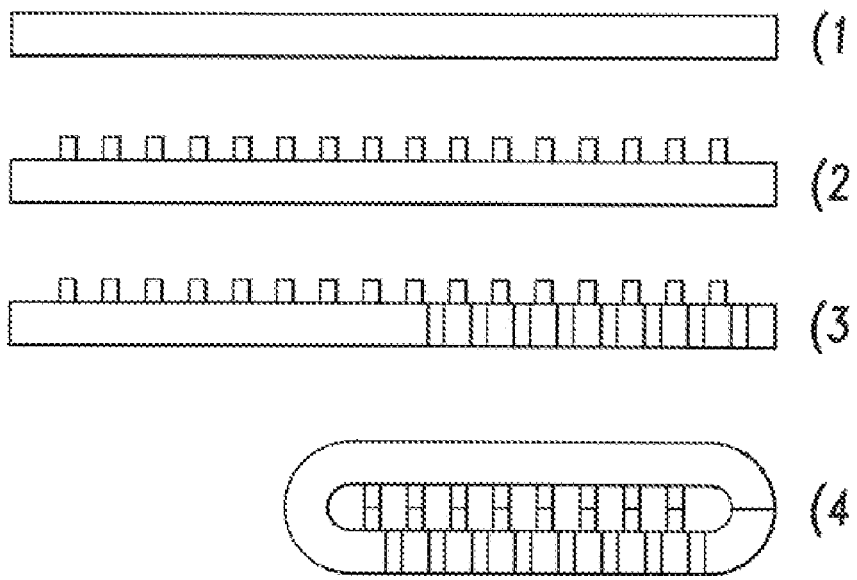
FIG. 3 illustrates the formation of an exemplary insert according to one exemplary method of the present invention.

Another possible approach for making an insert according to the present invention, an example of which is shown in FIG. 3, is to provide a flexible sheet (e.g., a thermoplastic sheet). A plurality of protuberances are formed, attached or otherwise provided to one surface of the sheet. The protuberances may be generally straight, they may be curled, or a combination thereof. The protuberances may be of generally the same size, a different size or a combination thereof. The protuberances may comprise fibres, solid rods, hollow rods (e.g., with a closed distal end), elongated ribs, or any combination thereof. The protuberances may be integrally manufactured with the sheet, manufactured separate from the sheet and then attached to the sheet, or a combination thereof. The sheet is also made to include a perforated region, that has a plurality of perforations for passage of air therethrough (from being drawn, blown or a combination). Perforations can be made during the initial fabrication of the sheet, or during a subsequent step (e.g., before, during or after any step of providing protuberances to the sheet). The sheet also will include at least one generally continuous region that is generally not perforated (except possibly to include one or a small number of ports for allowing fluid communication with the air mover). Preferably the generally continuous region adjoins the perforated region. In this manner, the generally continuous region and the perforated region can be folded upon each other and the sheet thereafter sealed together (e.g., by adhesive, by weld, by fastener or other mechanical attachment, or any combination thereof), so that the generally continuous region and the perforated region are substantially opposite each other. The protuberances thereby effectively form a spacer. As will be appreciated, in one embodiment (e.g., where the protuberances are elongated ribs) such a process lends itself well to manufacture of the sheet and protuberances simultaneously, such as by an extrusion or molding process.

According to one embodiment, the insert may be formed by insert molding a barrier material about a spacer material. Formation of the insert will generally include insertion of the spacer into a molding machine, closure of the molding machine about the layer and molding (e.g., compression molding, blow molding, injection molding or the like) the barrier material about the spacer material such that the spacer layer maintains internal open space that become substantially surrounded by the barrier material. Openings (e.g., through-holes) may be formed in the surround barrier material of the insert by directly molding the openings into the barrier material or by forming such openings in a subsequent cutting operation. Many different spacer materials may be employed as disclosed herein. As an example, one preferred material is sold under the tradename 3MESH® and is commercially available from Müller Textil GmbH, Germany or Müller Textiles, Inc., Rhode Island, USA. According to one preferred embodiment, a layer of the spacer material is placed within an blow molding machine and a polymeric barrier material is blow molded about the periphery of the layer such that the polymeric barrier material adheres to the spacer material at its periphery while maintaining internal open space within the spacer that is substantially enclosed by the polymeric barrier material. Any necessary perforations in the polymeric barrier may be formed during the molding process. Alternately, perforations in the polymeric barrier may be made by cutting with a knife, laser, a die or other suitable cutting tool or point specific removal of the polymeric barrier by degrading the barrier with energy (e.g. a laser, RF or infrared energy).

In one embodiment the spacer material is not affixed to the other components of the insert. The space may be held in place by sandwiching the spacer between other components e.g. two barrier layers or between a barrier layer and a cushion. In a preferred embodiment, the spacer is attached or connected to at least one other component of the insert or the seat (e.g. the cushion). As discussed previously, adhesives may be used to combine the components. In another aspect, the spacer may be heat staked or welded (e.g. spot welded) to one or more of the barrier layers or cushion. Heat staking is understood by a skilled artisan and may involve the application of a heated tip to a thermoplastic material to cause localize melting, which in turn would assist in attaching the space to other components. In addition to localize attachment provided by heat staking, localized and area attachment may be provided by welding. Welding may be accomplished through the use of infrared, radio frequency, ultrasonic, laser light, UV light or other electromagnetic energy to cause a physical or chemical bonding of the spacer to the other components. In addition, mechanical fasteners, as previously described, may also be used to attach the spacer to the barrier layer or cushion.

For the portions of the barrier layers, cushion or other components that are generally parallel to the occupant surface of the seat, the spacer is preferably attached without the use of adhesive, but with the mechanisms discussed above (e.g. staking welding, mechanical fasteners, etc). For portions of the barrier layers, cushion or other components that generally perpendicular to the occupant surface of the seat, the spacer is preferably attached with an adhesive, with the mechanisms discussed above or both.

The system for heating, cooling and/or ventilating the seat may include multiple inserts, multiple air movers, and/or multiple controllers. For an original equipment manufacturer (OEM) system, the system preferably includes an insert for each of the seat cushion and the backrest cushion, as well as an air mover for each insert. A single controller may be used to provide operational control to both air movers. Alternately, individual controllers are utilized for each air mover. In addition, multiple thermoelectric devices may be used (e.g. one or more for each insert). For an aftermarket system, the system preferably includes a single insert for both the seat cushion and the backrest cushion. In such an embodiment, a single air mover and a single controller may be used, although it is possible to utilize multiple air movers with a single insert.

According to another embodiment, an insert is formed of a single barrier layer that is secured (e.g., with an adhesive or otherwise) to a layer of spacer material such that the barrier layer overlays the layer of spacer material. In such an embodiment, it is preferable for the cushion to which the insert is applied to have an inset or cavity for receiving the layer of spacer material. The inset will typically have depth that, upon insertion of the barrier layer within the inset, locates the barrier layer near (e.g., within 1 cm, 0.5 cm, 0.2 cm) flush with a portion or surface of the cushion that surrounds the inset. The inset may be formed at the time the cushion is created (e.g. molded) or it may be formed later by cutting away or otherwise carving out cushion material. It is generally contemplated that the barrier layer may be additionally secured (e.g., adhesively sealed, sewn or otherwise mechanical attached) to the cushion. For example, the barrier layer may include a peripheral edge that extends beyond the spacer layer such that, upon insertion of the spacer layer within the inset of the cushion, the peripheral edge overlays the portion of the cushion that surrounds the inset. Advantageously, the peripheral edge can include an adhesive that can be adhered to the surrounding portion of the cushion for sealing the peripheral edge to the barrier layer of the surrounding portion of the cushion. Such adhesive may be covered by release material that is coextensive with the peripheral edge such that the release material can be peeled away just prior to location of the spacer layer within the inset and adhesion of the peripheral edge to the cushion. Sewing or mechanical fasteners may be used alone or in addition to adhesives to secure the peripheral edge of the barrier layer to the cushion. Alternately, the spacer having the barrier layer with the peripheral each may be molded to the cushion during formation or creation of the cushion. In this aspect, the inset or cavity of the cushion is formed to match the insert. In any embodiment where a barrier layer does not separate the cushion from the spacer, an air impermeable coating or lining on the cushion is preferred, but not required, less the absorption of heat or cold by the cushion.

In one embodiment, a particularly desirable system for heating and ventilating and/or cooling seats is formed according to the present invention by integration of a polymer resistive heater or, more particularly, a polymer film resistive heater. Such a heater will typically include a substrate provided a panel or layer with one or more resistive polymer layers (e.g., films) that are coextensive with a substantial portion or the entirety of a surface of the substrate. Such resistive polymer layers are often formed of polymer materials (e.g., polymer thick film materials) that create heat upon the flowing of an electrical current through the material based upon their resistance to the current. These materials can be positive temperature coefficient (PTC) materials, negative temperature coefficient (NTC) materials, constant temperature coefficient (CTC) materials, combinations thereof or the like. It is also contemplated that these materials can be resistive by virtue of materials within the polymeric material such as metals (e.g., copper, nickel, silver, combinations thereof or the like), carbon materials (e.g., carbon black) or other conductive materials. As yet another alternative, the resistive layer may be entirely or substantially entirely formed of these conductive materials. The substrate can be formed of a variety of materials include fabrics, woven materials, rigid materials, flexible materials, combinations thereof or the like. In one preferred embodiment, the substrate is form of a polymeric or plastic film that typically includes or is formed substantially entirely of polyurethane (e.g., thermoplastic or thermoset polyurethane), polyethylene, polypropylene, polystyrene, polyamide, polyimide, combinations thereof or the like.

Preferably, the polymer resistive heaters are air permeable when used in conjunction with ventilating and/or cooling systems, although not required. The heaters may include one or more openings (e.g., through-holes, slits or the like) for allowing air to flow therethrough. Alternatively, the substrate could be formed of an air permeable material such as a fabric for allowing air to flow through the heater. As another alternative or addition, the heater can be non-permeable but located so as to avoid restricting air flow.

Figure 4:
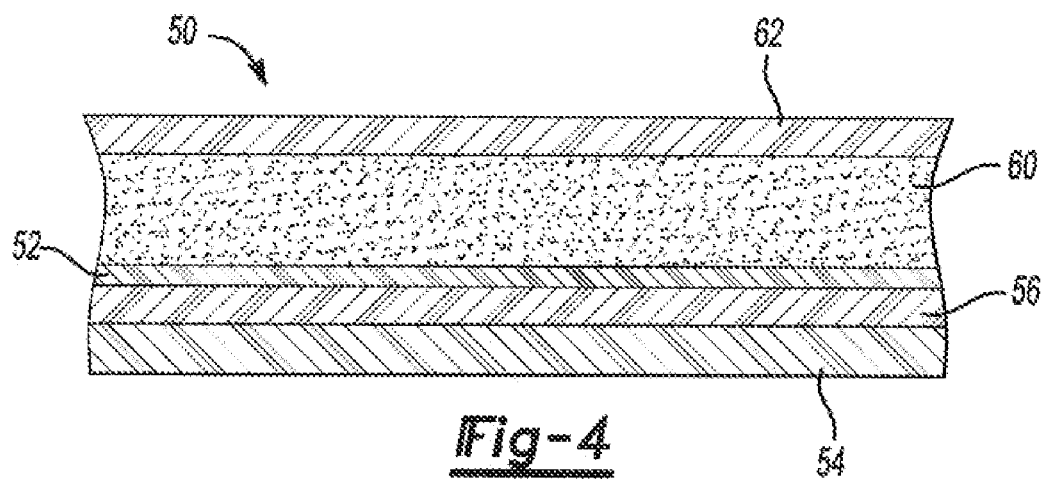
FIG. 4 is a sectional view of a portion of an exemplary laminate heater in accordance with an aspect of the present invention.
Figure 5:
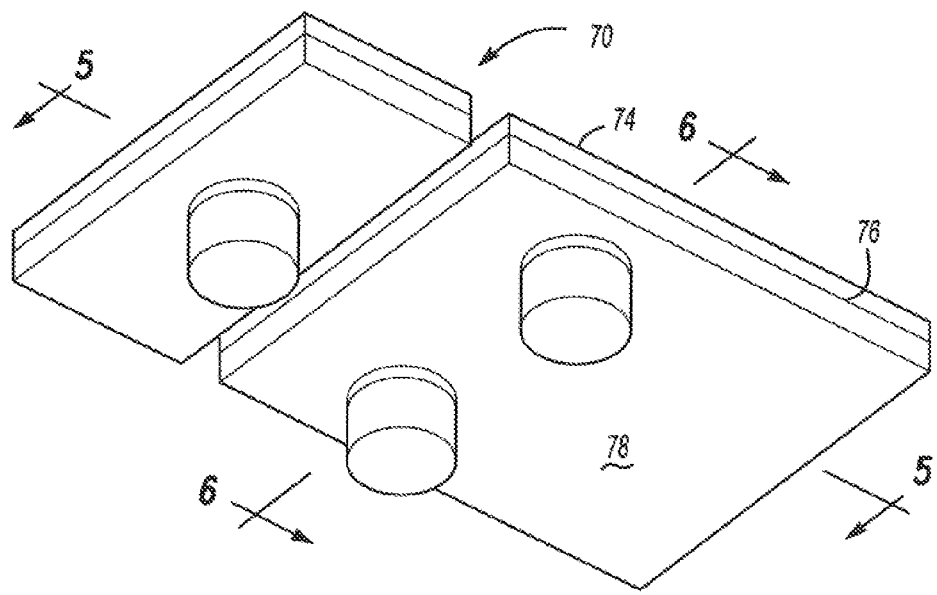
FIG. 5 is a perspective view of an exemplary insert in accordance with an aspect of the present invention.
Figure 6:
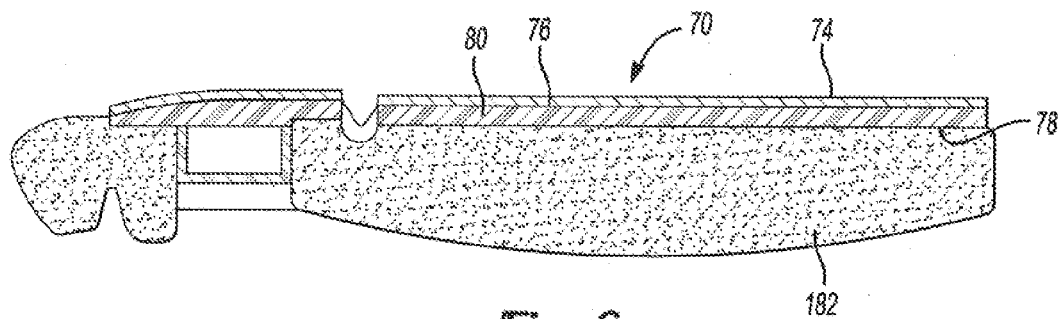
FIGS. 6 and 7 are sectional views of the exemplary insert of FIG. 5 applied to a seat cushion in accordance with an aspect of the present invention.
Figure 7:
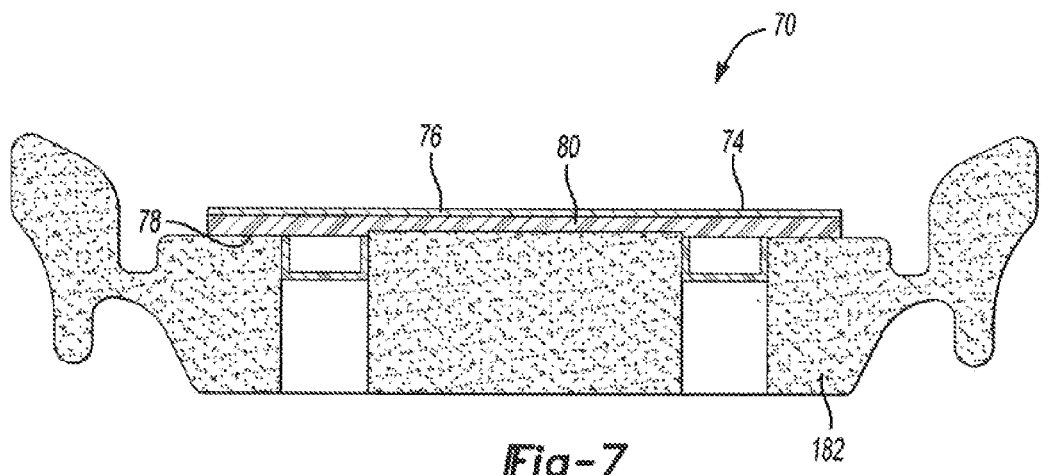
Figure 8:
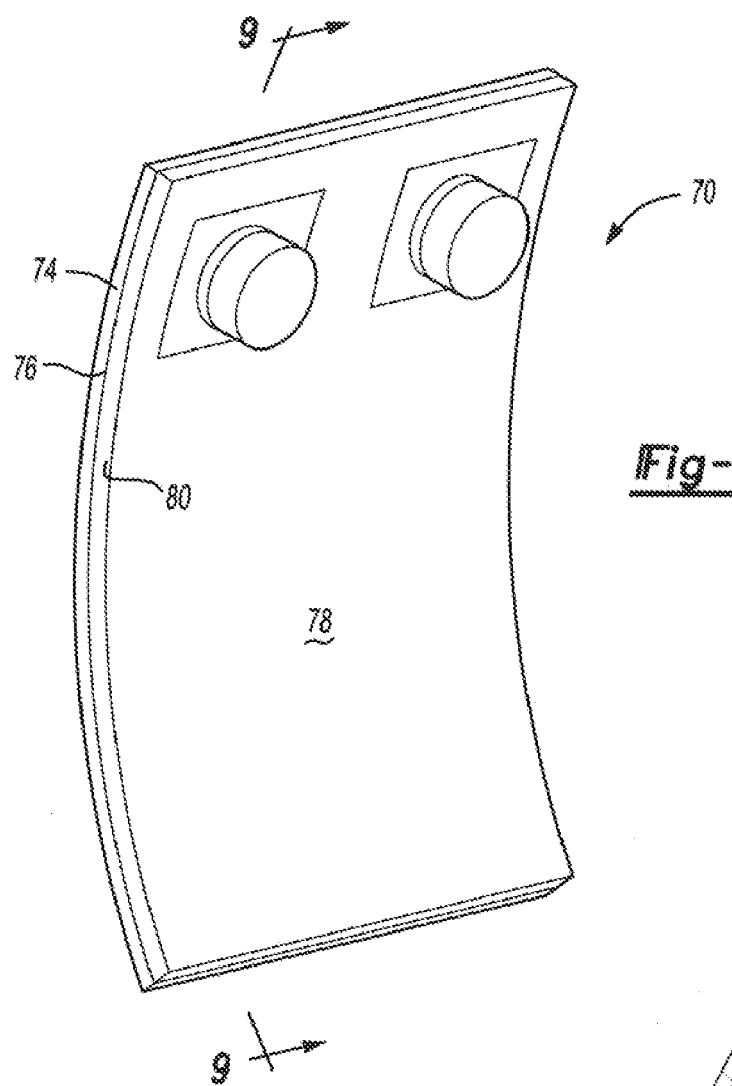
FIG. 8 is a perspective view of an exemplary insert in accordance with an aspect of the present invention.
Figure 9:
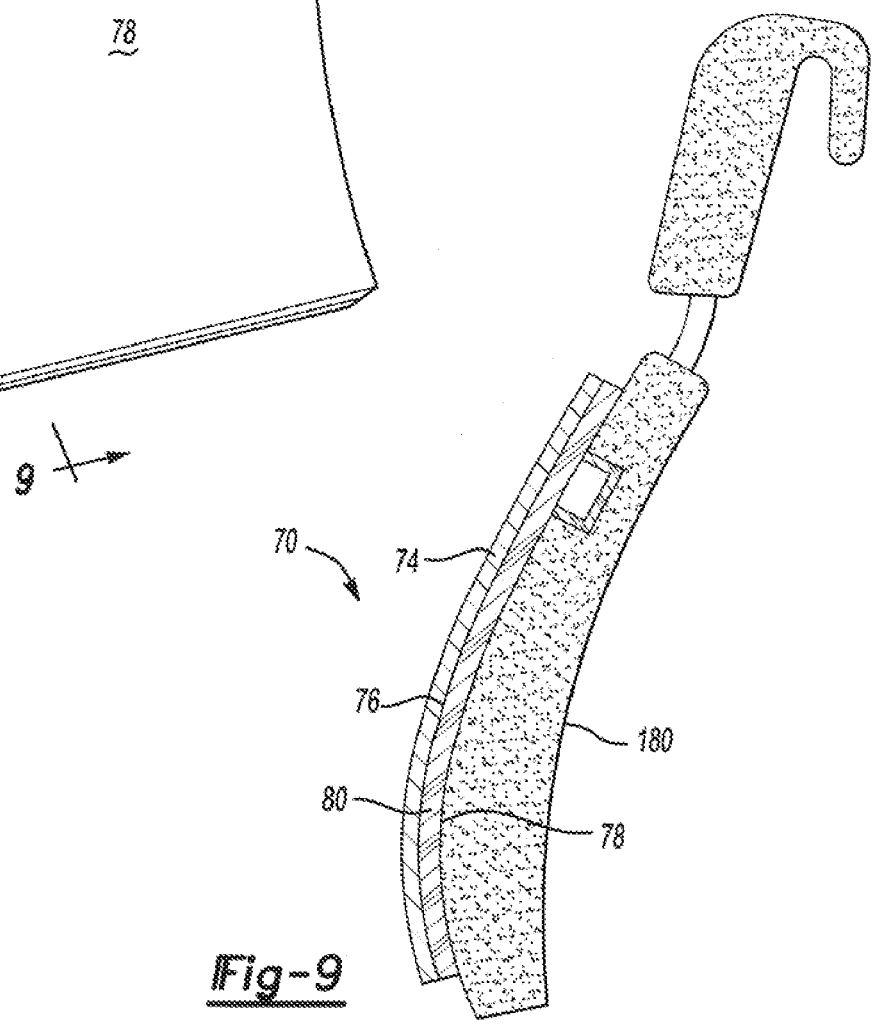
FIG. 9 is a sectional view of the exemplary insert of FIG. 8 applied to a seat backrest cushion in accordance with an aspect of the present invention.

Generally such heaters are constructed to have multiple layers and can include, in addition to the substrate layer and conductive polymer layer, also can include additional polymers film layers, protective layers (e.g., layers of gauze, elastomeric material or other protective materials, adhesive layers, release layers, combinations thereof or the like. FIG. 4 illustrates a section of one desirable laminate heater 50 that includes a resistive layer 52 as described. Preferably, the resistive layer 52 is formed of a polymeric material with a conductive metal (e.g., silver) dispersed throughout the material, although not required. Additionally, the heater 50 includes a first polymer film layer 54 and a second polymer film layer 56, either or both of which, may be considered the substrate. As shown, resistive layer 52 directly contacts that second polymer film layer. The heater 50 also includes a layer 60 of adhesive such that the resistive layer 52 is disposed or sandwiched between the adhesive layer and the substrate or one or more of the polymer film layers 54, 56. A release layer 62 additionally overlays the adhesive layer 60.

In addition to the above, these polymer conductive heaters can also include buss bars, electrical connectors and electrical busses or wires. In the typical heater, two or more buss bars are spaced apart and are electrically in communication with each other through the polymer conductive material. Each of the two or more buss bars are also typically in electrical communication with electrical connectors that connects the heater to a power source through the electrical busses or wires.

A heater, particularly a heater having a polymer resistive layer, can be integrated with a seating ventilation insert according to a variety of techniques and in a variety of configurations. Any of the inserts discussed herein may be combined with a heater have a polymer resistive layer. As an example, FIGS. 5-8 show exemplary ventilation inserts 70 to which such heaters attached. The inserts 70 include a forward layer 76 (i.e., a layer configured to be closer to a seat occupant), a rearward layer 78 and spacer layer 80. Of course, the insert 70 may include fewer or greater layers and each of the layers 76, 78, 80 may include multiple layers or sub-layers.

Generally, the heater 74 is formed as one or more layers and is integrated with, placed between and/or attached to one or a combination of these layers 76, 78, 80. The heater can be secured to these layers with a variety of attachments such as adhesive, fasteners, mechanical interlocks (which may be integral with layers, the heater or both), welds (e.g., welds formed from radio frequency welding, vibration welding, heat staking, combinations thereof or the like), melt attachments or seals (e.g., attachments formed by melting a portion or layer of the insert and/or a portion or layer of the heater such that one or both melt and attach to the other), combinations thereof or the like. When used, suitable adhesives can include acrylic, urethane, epoxy, one component, two component, radiation cured, moisture or air cured, cure-on-demand adhesives, combinations thereof or the like.

In one embodiment, the heater layer includes a release layer covering an adhesive layer and the release layer may be removed followed by contacting and adhering the adhesive layer to one of the layers of the ventilation insert, typically after the forward layer has been attached to the spacer layer, the rearward layer or both. In another embodiment, the heater layer is laminated (e.g., by adhesive securing) to the forward layer or the spacer layer (typically in a belt or stationary lamination process) prior to attachment of the forward layer, the spacer layer or both. It is also contemplated that the heater layer could be attached to (e.g., adhered to) the forward layer, the spacer layer or both with an adhesive coating and pressure process.

As examples, Inserts can have a forward layer, a rearward layer and a spacer layer intermediate the forward and rearward layers. In FIGS. 5-9, a heater layer 74 has been attached to an outer surface of the forward layer 76 (e.g., a surface of a protective or barrier layer) of the insert 70. As an alternative, however, a heater layer can be attached to an inner surface of the forward layer (e.g., a surface of a barrier layer of the forward layer), the spacer material, or both. It is also contemplated that a heater layer can be located between and attached to and/or located between a protective sub-layer and/or a barrier sub-layer of the forward layer of the insert. As used herein, a protective layer or sub-layer is intended to mean any layer that functions at least partially to reduce friction between at least one layer or sub-layer of the insert and another surface (e.g., a surface of a seat or the insert). Examples of typical protective layers include, without limitation, fibrous layers (e.g., fleece, mesh or gauze layers), elastomeric layers or the like. It is also contemplated that on or more layers of the forward layer may act as the substrate of the heater layer.

It can also be desirable, for heating and ventilation inserts of the present invention, to attach one or more air movers (e.g., fans) to the inserts using fan assemblies and attachment techniques that provide desirable characteristics such as flexibility, low cost, robust construction and the like. Moreover, it can be particularly desirable to provide fan assemblies and attachment techniques that are well suited to withstand and do not interfere with assembly of the seat of an automotive vehicle.

Figure 13A:
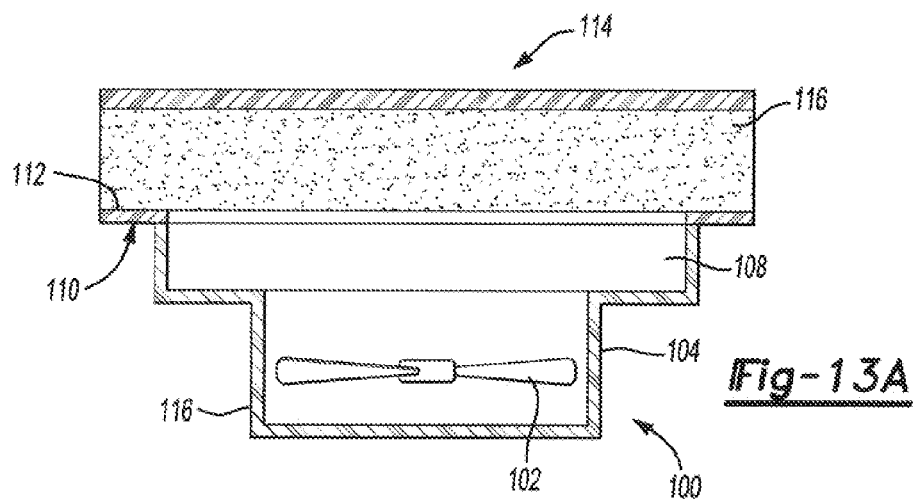
FIGS. 13A-13C are sectional views of exemplary attachment techniques for attaching an air mover to an insert according to the present invention.
Figure 13B:
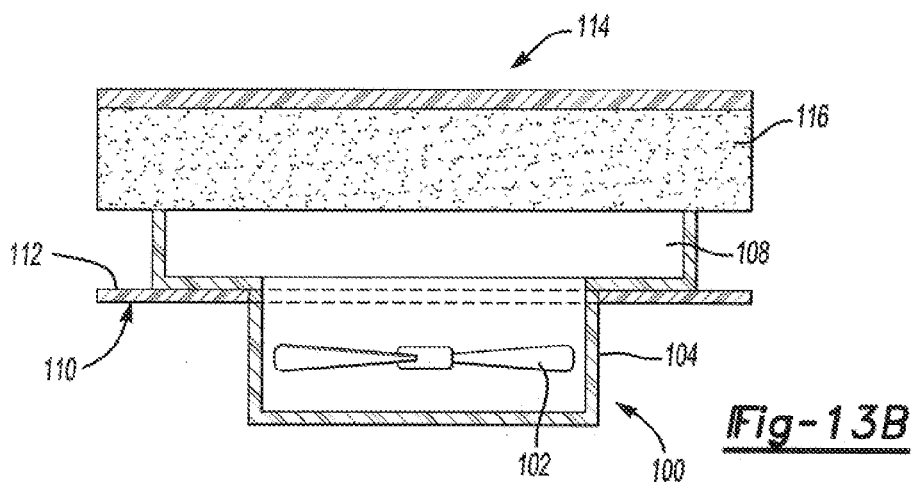
Figure 13C:
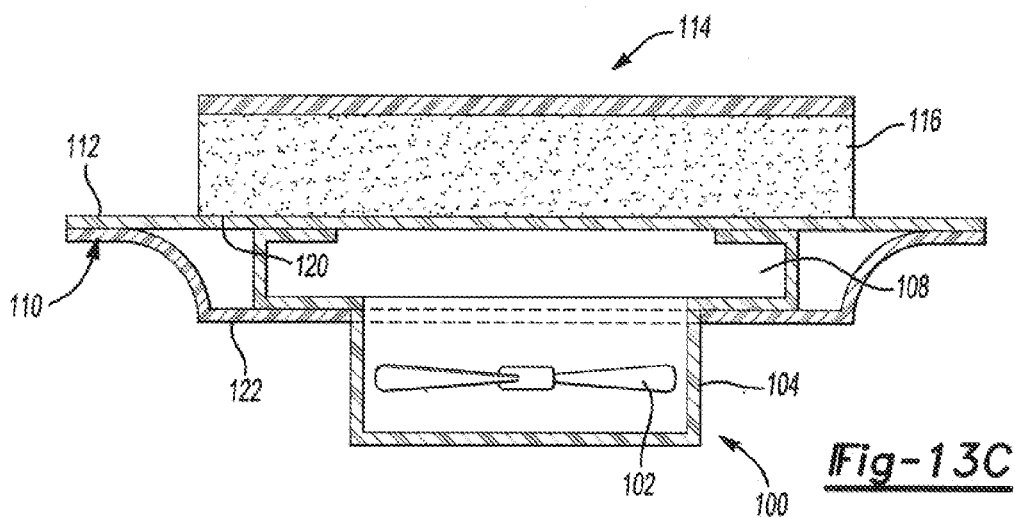

Typically, as illustrated in FIGS. 13A-13C, an air mover 100 includes an air moving member, which is shown and referred to herein as a fan 102, and a housing 104 at least partially or substantially entirely surround the fan 102. Of course, other air moving members may be used such as a pump. Various attachments such as an adhesive, one or more mechanical attachment, interference fits, hook an loop fasteners, magnets, combinations thereof or the like may be employed to attach the air movers and particularly the housing of the air movers to portions of the inserts such as barrier layers (e.g., forward or rearward layers including barrier sub-layers), protective layers, spacers materials, combinations thereof or the like.

In FIG. 13A, an air mover 100 is attached to an outer surface 110 of a layer 112, particularly a forward or rearward layer 112, of an insert 114. Preferably, the housing 104 of the air mover 100 is secured to the surface with an adhesive, one or more mechanical fasteners or both. In FIG. 13B, an air mover 100 is attached to an insert 114, at least in part, by interference fitting a flange 108 (e.g., a circumferential flange) of the air mover 100 between a layer 110, particularly a forward or rearward layer 110, of the insert 114 and a mass, particularly a layer 116, of spacer material of the insert 114. Of course, adhesives or additional mechanical fasteners may also attach the air mover 100 to one or both of the layers 110, 116. In FIG. 13C, an air mover 100 is attached to an insert 114, at least in part, by interference fitting a flange 108 (e.g., a circumferential flange) of the air mover 100 between a barrier layer 120 of the insert 114 and a protective layer 122 of the insert 114, both of which are preferably sub-layers of a forward or rearward layer of the insert 114. Of course, adhesives or additional mechanical fasteners may also attach the air mover 100 to one or both of the layers 120, 122.

Figure 10:
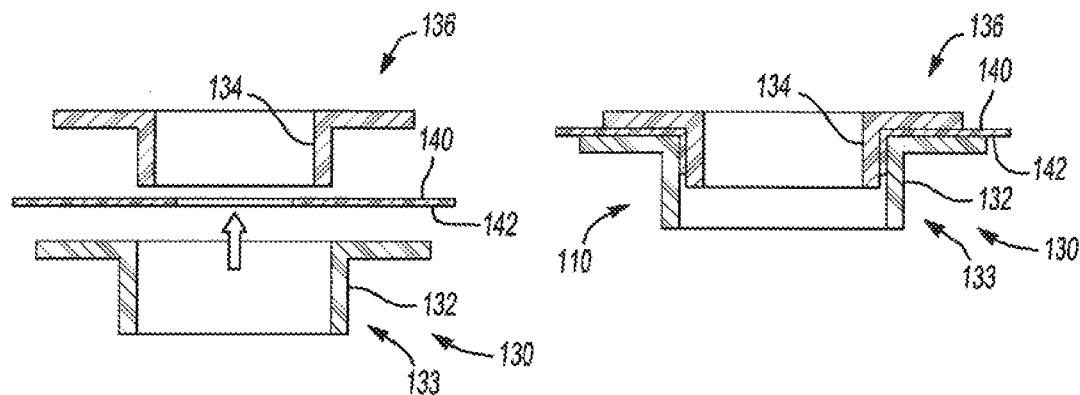
FIGS. 10-12 are sectional views of exemplary attachment techniques for attaching an air mover to an insert according to the present invention.

As another preferred attachment of the air mover to the insert, it is contemplated that the housing of the air mover may be configured to mechanically or otherwise engage a connector member. As one example, FIG. 10 shows an air mover 130 having an engagement portion, shown as an annular wall 132 of a housing 133, that compression fits with an engagement portion, shown as an annular wall 134, of a connector member 136 and, at least in the embodiment shown, sandwiches a portion 140 (e.g., an annular portion) of a layer 142 (e.g., a forward or rearward layer) of the insert therebetween. As shown, the engagement portion 134 of the connector member 136 is smaller (e.g. has a smaller circumference) than the engagement portion 132 of the housing 133 and is compression fit within the portion 132 of the housing 133, although the reverse may also be done as well.

Figure 11:
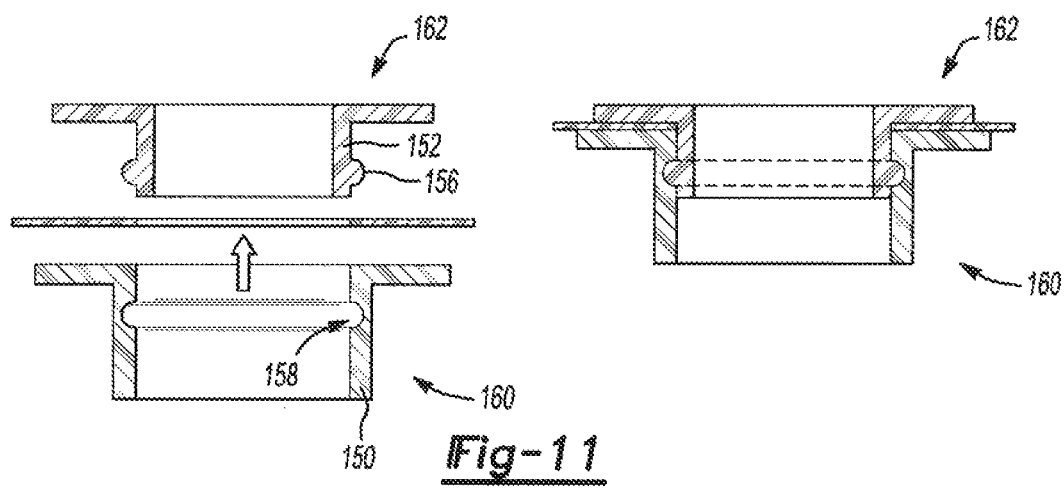
Figure 12:
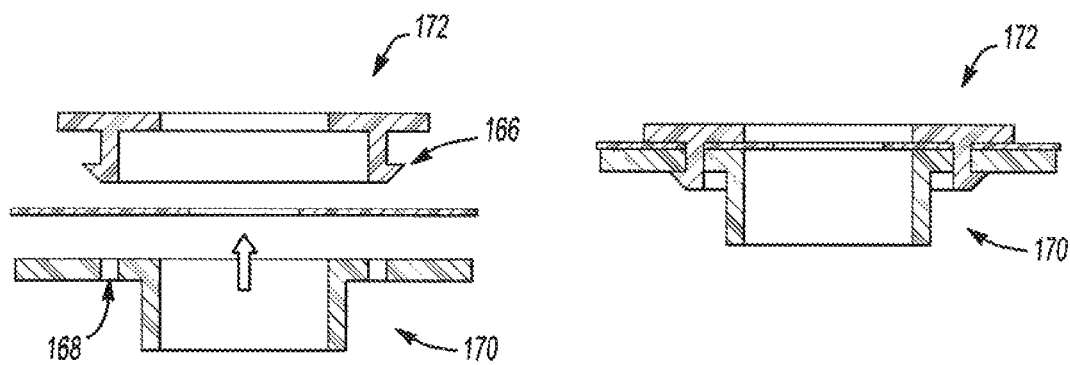

In addition or as alternative to compression fitting, the engagement portions of the housing and/or connector member may include one or more mechanical interlock features. In FIG. 11, one of the portions 150, 152 includes a protrusion 156 (e.g., an annular or semi-annular protrusion) that is configured to extend into one or more openings 158 (e.g., a cavity) upon location of a housing 160 adjacent the connector member 162 thereby interlocking the two together. In FIG. 12, one or more protrusions 166 are generally hook shaped and designed to extend through the one or more openings 168 (e.g., through-holes) upon location of the housing 170 adjacent the connector member 172 thereby interlocking the two together.

In any of the embodiments, it is generally contemplated that the air mover housing or parts thereof could be made of a variety of material including, without limitation, metals and plastics. In one preferred embodiment, however, a portion or substantially the entirety of the housing of the air mover is formed of an elastomeric or rubber material such as neoprene rubber, nitrile rubber, butadiene rubber, isoprene rubber, butylene rubber, urethane rubber, chloroprene rubber, silicone, combinations thereof or the like.

With reference to FIG. 13, it is contemplated that a portion or the substantial entirety of a body portion 176 (e.g., annular body wall) of the housing 104 may be formed of an elastomeric material. Additionally or alternatively, a portion or the substantial entirety of a flange portion 108 (e.g., an outwardly extending annular flange wall) of the housing 104 may formed of an elastomeric material. Advantageously, such elastomeric materials can provide additional tolerance for compression or other forces that may be caused by assembly or usage of seat including the ventilation and/or heating systems of the present invention.

Generally, it is contemplated that one fan may be attached to an insert or multiple fans may be attached to an insert and the fans may have variable sizes and configurations. In one preferred embodiment, the heating and/or ventilation system of the present invention will include one or multiple fans connected to an insert at predetermined locations such that those fan(s) are positioned within openings (e.g., cavities, through-holes or combinations thereof) of a cushion (e.g., a foam cushion) of a seat (e.g., an automotive seat) upon assembly of the insert to the seat. Examples of such configuration are shown in the automotive seat back 180 and insert 70 of FIGS. 8 and 9 and the automotive seat cushion 182 and insert 70 of FIGS. 5-9.

Another desirable embodiment of the present invention is depicted in FIG. 14. As can be seen, a system 200 is illustrated to have an insert 202 overlaying a seat cushion 204 and the insert is in fluid communication with an air mover. For heating, a plurality (e.g., 2, 3, 4 or more) heating pads 205 are disposed upon (e.g., overlay) a forward layer 206 of the insert 202.

Each of the heating pads 205 includes one or more electrical terminals 208 interconnected by a resistive material 210 and each of the terminal is connected to an energy source (e.g., electrically connected to the battery of a vehicle). Although the heating pads 205 may be selected from a variety of heaters, it is preferred that the heating pads 205 are formed as resistive polymer heaters as discussed herein or otherwise. Thus, the heating pads 205 may be attached to the forward layer 206 or other portion of the insert 202 with any of the techniques discussed herein such as adhesives, mechanical fasteners or the like.

As shown, the forward layer 206 of the insert 202 includes multiple openings 214 for promoting fluid communication between a surface of a seat and the insert 202 as is describe herein. Preferably, although not required, the pads 205 are disposed on the forward layer 206 away from the openings 214 such that the pads 205 avoid substantial restriction of air flow through the openings 214.

Also shown, busses or wires 220 can extend between and connect the terminals 208 of the pads 205 for allowing the flow of electrical current therethrough. In a preferred embodiment, the busses or wires 220 are meandering (e.g., travel is a side to side manner, zig-zag manner or the like) as they extend from one terminal 208 to others. Such indirect extension can accommodate stretching of the insert and/or movement of the terminals 208 toward and/or away from each other. It is also contemplated that the busses 220 can be located outside the rest of the insert or may extend from one terminal to another at least partially inside the layers (e.g., between the forward layer and the spacer and/or rearward layer) of the insert.

As additional or alternative aspect of the present invention, it is contemplated that a portion (e.g., a flange) of the air mover housing can overlap a seat cushion for supporting the air mover. In such an embodiment, the air mover may be attached (e.g., adhesively secured) to the spacer material or may only be located adjacent an in fluid communication with the spacer material of an insert.

Figure 15:
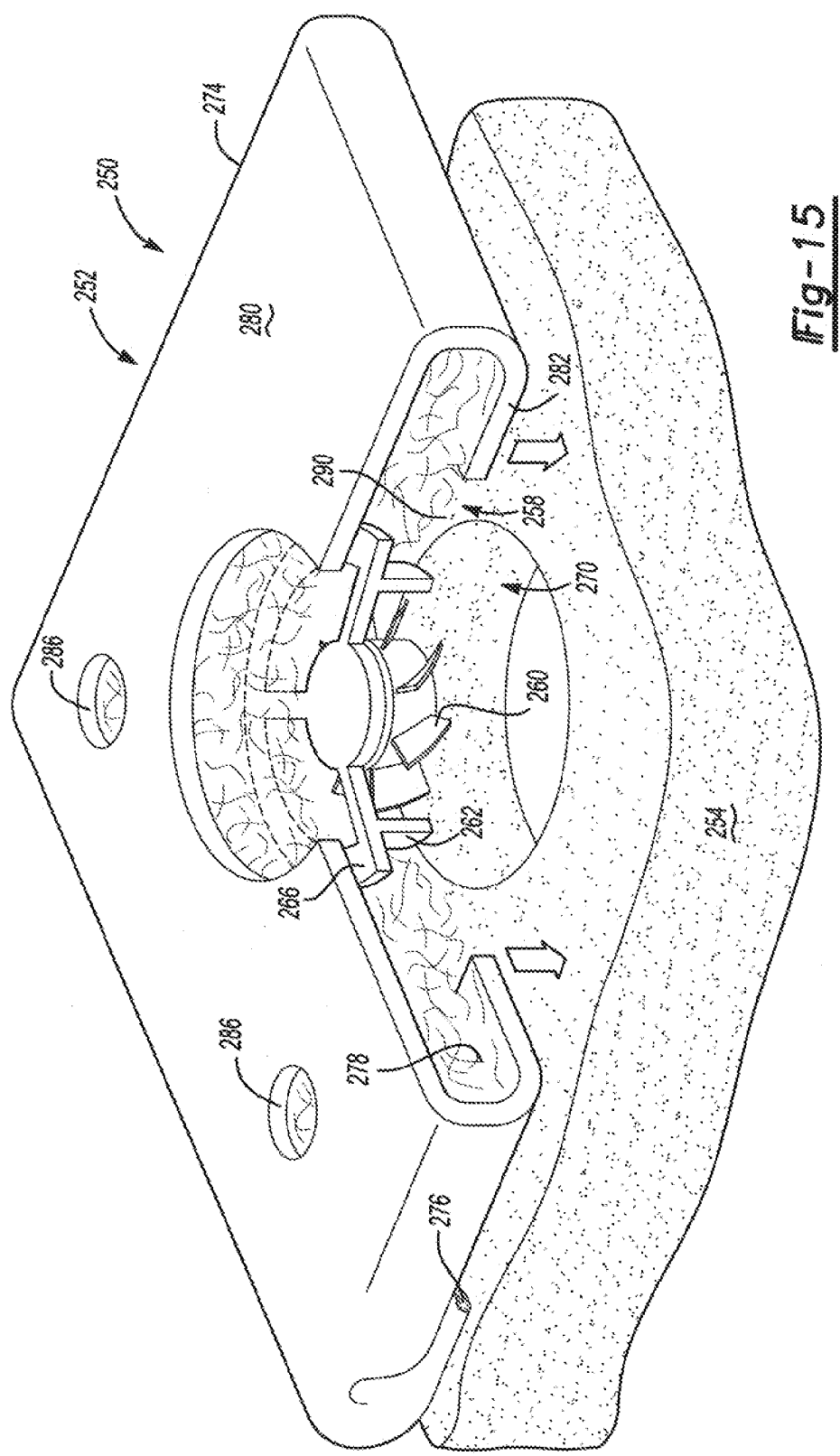
FIG. 15 is a perspective cut-away view of an exemplary seat comfort system according to an aspect of the present invention.

With reference to FIG. 15, a system 250 is illustrated to include a seat insert 252 located over a seat cushion 254. The system 250 includes an air mover 258 with a fan 260 and a housing 262. As shown, the air mover housing 262 includes an annular flange 266 that extends outwardly from the air mover 258 and is designed to overlap a portion of the seat cushion 254 for supporting the air mover 258. In the particularly embodiment illustrated, the cushion 254 includes an annular cavity 270 for receipt of the flange 266.

The insert 252 includes a bag 274 that has one main opening 276 suitable for receipt of spacer material 278. As shown, the bag 274 defines a forward barrier layer 280 and a rearward barrier layer 282 and the main opening 276 is sealed adjacent one side edge of the insert 252 by, for example, melt sealing, folding over of the bag, adhesive sealing, sewing, combinations thereof or the like. The forward layer 280 includes multiple openings 286 (e.g., holes or perforations) for fluid communication with a trim surface of a seat and the rearward layer 282 includes at least one opening 290 for fluid communication with the air mover 258. Optionally, the air mover 258, particularly its housing 262 may be secured (e.g., adhesively or otherwise) to the spacer material 278.

Figure 15A:
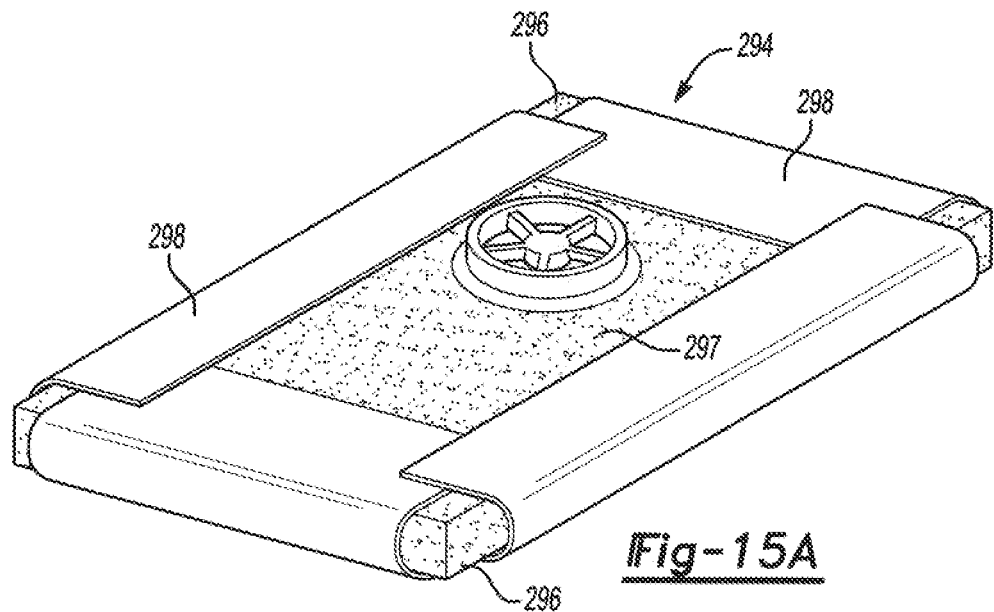
FIGS. 15A and 15B illustrate further alternative option of seat comfort system according to the present invention.
Figure 15B:
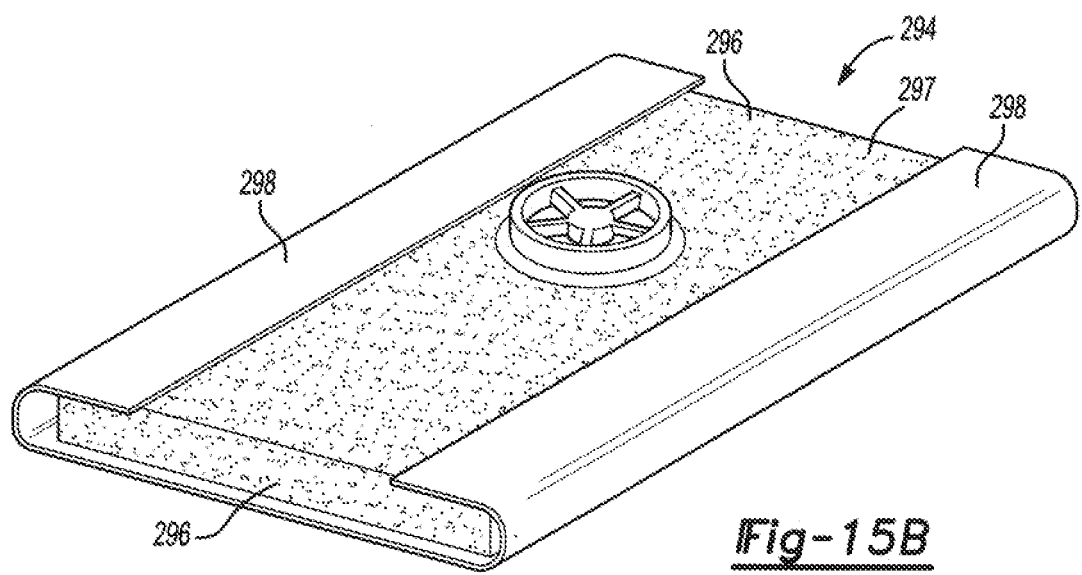

As further additions or alternatives, and with reference to FIGS. 15A and 15B, it is contemplated that an insert 294 may be formed by covering substantially only the edges 296 of a spacer material 297 with barrier layers 298. As shown, barrier layers 298 wrap about edges 296 of the spacer material 297 while leaving substantial body portions (e.g., 30%, 50%, 60% or more) of the spacer material 297 uncovered by the barrier layers.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An apparatus for use on top of a cushion, the top of the cushion disposed under a trim cover, having an air-permeable trim surface, of a ventilated seating system, and including two or more through-holes, the apparatus comprising:
   a forward layer including a plurality of openings in fluid communication with the air-permeable trim surface;
   a rearward layer comprising a first material and including at least two openings and having an inner surface and an outer surface;
   a spacer material sandwiched between the forward layer and the rearward layer, creating an open space within the apparatus;
   two or more air movers disposed outside of the rearward layer of the apparatus, each air mover attached to an inner surface of the rearward layer at one of the at least two openings with an outwardly extending annular flange wall, and in fluid communication with the spacer material and the air-permeable trim cover;
   wherein each of the air mover of the apparatus is dimensioned to fit within a cavity created by the two or more through-holes and disposed therein.

2. The apparatus according to claim 1, wherein the air movers also include a controller combined into a housing of the air movers.

3. The apparatus according to claim 1, wherein the outwardly extending annular flange wall of each of said air movers is adhered to the inner surface of the rearward layer.

4. The apparatus according to claim 1, wherein the apparatus further comprises a connector member, the connector member at least partially sandwiching the rearward layer with the outwardly extending annular flange wall of one of the two or air movers.

5. The apparatus according to claim 1, wherein the apparatus is operationally connected to a thermoelectric element to provide heating or cooling.

6. The apparatus according to claim 1 further comprising a heater integrated in the forward layer.

7. The apparatus according to claim 6 wherein the heater comprises a positive temperature coefficient material.

8. The apparatus according to claim 7 wherein the heater comprises a substrate layer comprising a polymeric film.

9. The apparatus according to claim 8 wherein the polymeric film includes one or more openings for allowing air to flow through the polymeric film.

10. The apparatus according to claim 6 wherein the heater comprises at least one of a metal wire or a carbon wire.

11. The apparatus according to claim 1 wherein the forward layer, the rearward layer, or both comprises at least one of a fleece, a mesh or a gauze material.

12. The apparatus according to claim 1 wherein the forward layer and the rearward layer are sealed about a periphery forming a sealed peripheral edge.

13. The apparatus according to claim 1 wherein the air movers are each a fan that is adapted to move air through the insert in a direction that will push the air through the air-permeable trim surface and toward an occupant.

14. The apparatus according to claim 1 wherein the air movers are each a fan that is adapted to move air through the insert in a direction that will pull air through the air-permeable trim surface and away from an occupant.

* * * * *

UNITED STATES PATENT AND TRADEMARK OFFICE
CERTIFICATE OF CORRECTION

PATENT NO. : 8,162,391 B2
APPLICATION NO. : 13/172067
DATED : April 24, 2012
INVENTOR(S) : Marinko Lazanja et al.

It is certified that error appears in the above-identified patent and that said Letters Patent is hereby corrected as shown below:

Second to last page of the Patent, Claim 4, line 50, the word "More" is missing.

Claim 4 currently reads as; "The apparatus according to claim 1, wherein the apparatus further comprises a connector member, the connector member at least partially sandwiching the rearward layer with outwardly extending annular flange wall of one of the two or air movers."

Claim 4 should read as; "The apparatus according to claim 1, wherein the apparatus further comprises a connector member, the connector member at least partially sandwiching the rearward layer with outwardly extending annular flange wall of one of the two or more air movers."

Signed and Sealed this
Thirtieth Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,162,391 B2
APPLICATION NO. : 13/172067
DATED : April 24, 2012
INVENTOR(S) : Marinko Lazanja et al.

It is certified that error appears in the above-identified patent and that said Letters Patent is hereby corrected as shown below:

Column 14, line 58 (Claim 4, line 5) the word "More" is missing.

Column 14, lines 54-58, Claim 4 currently reads as; "The apparatus according to claim 1, wherein the apparatus further comprises a connector member, the connector member at least partially sandwiching the rearward layer with outwardly extending annular flange wall of one of the two or air movers."

should read as; --The apparatus according to claim 1, wherein the apparatus further comprises a connector member, the connector member at least partially sandwiching the rearward layer with outwardly extending annular flange wall of one of the two or more air movers.--

This certificate supersedes the Certificate of Correction issued October 30, 2012.

Signed and Sealed this
Fourth Day of December, 2012

David J. Kappos
*Director of the United States Patent and Trademark Office*